United States Patent
Gopalakrishnan et al.

(10) Patent No.: US 10,602,019 B2
(45) Date of Patent: Mar. 24, 2020

(54) METHODS AND SYSTEMS FOR ENHANCING IMAGE QUALITY FOR DOCUMENTS WITH HIGHLIGHTED CONTENT

(71) Applicant: XEROX CORPORATION, Norwalk, CT (US)

(72) Inventors: Sainarayanan Gopalakrishnan, Chennai (IN); Rajasekar Kanagasabai, Chennai (IN); Vignesh Doss, Palanichettipatti (IN)

(73) Assignee: Xerox Corporation, Norwalk, CT (US)

( * ) Notice: Subject to any disclaimer, the term of this patent is extended or adjusted under 35 U.S.C. 154(b) by 47 days.

(21) Appl. No.: 16/039,405

(22) Filed: Jul. 19, 2018

(65) Prior Publication Data
US 2020/0028987 A1    Jan. 23, 2020

(51) Int. Cl.
*G06K 9/00* (2006.01)
*H04N 1/393* (2006.01)
*H04N 1/411* (2006.01)

(52) U.S. Cl.
CPC ....... *H04N 1/3935* (2013.01); *G06K 9/00463* (2013.01); *H04N 1/411* (2013.01)

(58) Field of Classification Search
CPC .. H04N 1/3935; H04N 1/40068; H04N 1/411; G06K 9/00463; G06K 9/00456; G06K 9/2054; G06T 7/0079; G06T 5/00
See application file for complete search history.

(56) References Cited

U.S. PATENT DOCUMENTS

| | | | | |
|---|---|---|---|---|
| 2003/0095144 A1* | 5/2003 | Trevino | ................. | A61B 5/055 715/764 |
| 2007/0253620 A1* | 11/2007 | Nagarajan | ............. | G06K 9/2054 382/164 |
| 2014/0016151 A1* | 1/2014 | Malik | .................... | G09G 5/026 358/1.13 |
| 2018/0027250 A1* | 1/2018 | Fram | ...................... | G16H 30/20 375/240.08 |

* cited by examiner

*Primary Examiner* — Said M Elnoubi (57) ABSTRACT

Examples of systems and methods for enhancing image quality for documents with highlighted portions are described. A highlighted portion from a received input is detected. The highlighted portion is automatically segmented as a text layer and the remaining portion is further segmented as a separate text layer and an image layer. A resolution is assigned to the highlighted portion, wherein the resolution assigned to the highlighted portion is greater than the respective resolution for the text layer and the image layer, to improve quality of the highlighted portion. The text layer corresponding to the highlighted portion and the separate text layer and the image layer are integrated together to generate a scanned document in a Mixed Raster Content (MRC) file format.

20 Claims, 5 Drawing Sheets

| CONVENTIONAL MRC BEHAVIOR 510 | | | PRESENT DISCLOSURE MRC BEHAVIOR 520 | |
|---|---|---|---|---|
| TEXT 502 | HIGHLIGHT CONTENT 504 | IMAGE 506 | TEXT 502 | HIGHLIGHTED CONTENT 504 | IMAGE 506 |
| 200 DPI 508 | 200 DPI 511 | 100 DPI 512 | 200 DPI 514 | 600 DPI 516 | 100 DPI 518 |

*FIG. 5*

FIG. 6

METHODS AND SYSTEMS FOR ENHANCING IMAGE QUALITY FOR DOCUMENTS WITH HIGHLIGHTED CONTENT

TECHNICAL FIELD

The present subject matter relates to image processing and, particularly to, methods and systems for enhancing image quality for documents with highlighted content.

BACKGROUND

With the advent of image processing technology, physical documents, i.e., paper documents, are now stored digitally. The physical documents include various content types, such as text and image, which may be processed separately to generate a digital document. Such processing is generally performed to maintain a balance between quality of the digital document and a compression ratio. Lower compression ratio may ensure a higher quality but at the same time may substantially increase the file size, while a higher compression ratio may do the opposite. Therefore, typically, an image portion of the physical document may be processed to have a higher compression ratio, i.e., lower resolution, as compared to a text portion.

Often times, a text section of the physical document is highlighted to identify important content or content that may require attention. Owing to importance associated with such highlighted sections, such highlighted text sections are to be preserved, i.e., appropriately captured in a digital version of the physical document. However, available image processing techniques may erroneously identify a highlighted text section as an image. As a result, the highlighted text sections may not have appropriate image quality owing to high compression and may undergo lossy compression. Consequently, the highlighted text sections in the digital document may be illegible, blurred, or hazy, thereby defeating the purpose of highlighting such sections. Considering the highlighted sections are important for users, there is a need for efficient methods and systems to improve image quality for documents with highlighted sections/portions.

SUMMARY

According to aspects illustrated herein, a method for enhancing image quality for documents with highlighted portions, is described. The method includes detecting a highlighted portion from a received input and automatically segmenting the highlighted portion as a text layer and further segmenting the remaining portion as a separate text layer and an image layer. Further, a resolution is assigned to the highlighted portion. The resolution assigned to the highlighted portion is greater than the respective pre-defined resolution for the separate text layer and the image layer, to improve quality of the highlighted portion. The text layer corresponding to the highlighted portion and the separate text layer and the image layer are integrated to generate a scanned document in a Mixed Raster Content (MRC) file format.

According to further aspects illustrated herein, a method for processing documents with highlighted content is described. The method includes receiving an input and automatically detecting a highlighted content from the received input and marking the remaining content as a non-highlighted content. The highlighted content is automatically segmented into a text layer and further the non-highlighted content is segmented into an image layer and a text layer. A resolution value is assigned to the text layer corresponding to the highlighted content and a resolution value is assigned each to the image layer and the text layer corresponding to the non-highlighted content. The resolution value assigned to the highlighted content is greater than the respective resolution for the image layer and the text layer, to improve quality of the highlighted content. The text layer corresponding to the highlighted content is compressed using JBIG2 compression and the image layer is compressed using JPEG compression, while the text layer (separate from the text layer corresponding to the highlighted content) is compressed using JBIG2 compression. The text layer corresponding to the highlighted content and the image layer and the text layer corresponding to the non-highlighted content are integrated to generate an image data in an MRC file format.

According to additional aspects herein, an image processing system is described. The image processing system includes a processor, a content identification unit coupled to the processor, and a document generation unit coupled to the processor. The content identification unit is to detect a highlighted portion from a received document and to automatically segment the highlighted portion as a text layer and further segment the remaining portion as a separate text layer and an image layer. The document generation unit is to assign a resolution to the highlighted portion, wherein the resolution assigned to the highlighted portion is greater than a resolution for the remaining portion, to improve quality of the highlighted portion. Further, the document generation unit is to integrate the text layer corresponding to the highlighted portion and the separate text layer and the image layer to generate a scanned document in a Mixed Raster Content (MRC) file format.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems and processes that are consistent with the subject matter as claimed herein.

DESCRIPTION

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below. Prior to describing the present subject matter in further detail, various terms that will be used throughout the following discussion are defined for better understanding of the subject matter. It will be appreciated that the definitions provided herein are only for the purpose explanation and not as a limitation.

The terms "a" and "an" are intended to denote at least one of particular elements. As used herein, the term "includes" means includes but not limited to, the term "including" means including but not limited to. The term "based on" means based at least in part on.

The term "multi-function device" refers to a device or a combination of multiple devices configured to perform one or more functions, but not limited to, scanning, printing, copying, imaging, and so forth. The multi-function device includes software, hardware, firmware, or a combination thereof. In context of the current disclosure, the multi-function device focuses on enhancing image quality for highlighted portions of a document.

The term "input" includes a document or an image data. The term "document" refers to an original paper document, also referred to as, the document, which can be in a physical form, such as printed on paper including information in form of text and/or image. The document may be, for example, a print out, a page of a book, a brochure, a flyer, a page of a newspaper, and the like. In an example, the document includes a highlighted content/section/portion. The document may also be referred to as a physical document or vice-versa. The "image data" is obtained after scanning the document.

The term "highlighted content" refers to a section/content of the document that is to be differentiated from the remaining content of the document. The content can be highlighted using pens or markers, which may produce bright yet transparent color to make underlying content noticeable. The highlighted content may be interchangeably used with the term highlighted portion/section. The content other than the highlighted content contributes to the remaining portion of the document and is referred to as a non-highlighted content. The highlighted content may correspond to a portion of the document having a background color different than a background color of rest of the document. The highlighted content is the content selected by the user.

The term "digital document" refers to a document in a virtual or software form (embodied in a software file). The virtual form can also be referred to as a digital form, an electronic version, a digital file or the like. The digital document is generated by a computing system, such as an image processing system. The digital document is the output.

The term "resolution" or "resolution factor" refers to extent of detail/information to be captured in an output (i.e., a digital document) and thus, is indicative of quality of the image. In an example, the resolution may be defined in terms of dots per inch (DPI) or pixels per inch (PPI). The DPI may indicate a number of individual dots that can be placed in a line within the span of 1 inch. Thus, higher the resolution factor, the better the quality.

"Mixed or Multiple Raster Content (MRC) file format" is a format for storing compressed image data into at least two components, namely text layer component and an image layer component. The digital document is created in an MRC format.

"Image layer" is one of the layer components stored in the MRC file format. The image layer may be used for storing continuous-tone (i.e., contone) information, such as background attributes of an image, like pictures and/or smoothly varying background colors. The image layer may include the background information and non-textual information. The image layer is referred to as a background layer.

"Text layer" is one of the layer components stored in the MRC file format. The text layer may hold the color information corresponding to the text and/or line art found in the text layer.

Exemplary Embodiments

According to aspects illustrated herein, a method for enhancing image quality for documents with highlighted portions is described. The method includes detecting a highlighted portion from a received input and automatically segmenting the highlighted portion as a text layer and further segmenting the remaining portion as a separate text layer and an image layer. Further, a resolution is assigned to the highlighted portion. The resolution assigned to the highlighted portion is greater than the respective pre-defined resolution for the separate text layer and the image layer, to improve quality of the highlighted portion. The text layer corresponding to the highlighted portion and the separate text layer and the image layer are integrated to generate a scanned document in a Mixed Raster Content (MRC) file format.

The received input is one of a document and an image data obtained upon scanning. The method includes identifying text content and image content from the remaining portion of the received input. The text content is segmented as the separate text layer and the image content is segmented as the image layer. The method includes extracting content corresponding to the highlighted portion of the received input. The method further includes extracting content corresponding to the remaining portion of the received input. The text layer corresponding to the highlighted portion and the separate text layer is compressed using JBIG2 compression and the image layer is compressed using JPEG compression. The method includes storing the generated scanned document. The method is implemented by a non-transitory computer-readable medium including instructions executable by a processor.

According to further aspects illustrated herein, a method for processing documents with highlighted content is described. The method includes receiving an input and automatically detecting a highlighted content from the received input and marking the remaining content as a non-highlighted content. The highlighted content is automatically segmented into a text layer and further the non-highlighted content is segmented into an image layer and a text layer. A resolution value is assigned to the text layer corresponding to the highlighted content and a resolution value is assigned each to the image layer and the text layer corresponding to the non-highlighted content. The resolution value assigned to the highlighted content is greater than the respective resolution for the image layer and the text layer, to improve quality of the highlighted content. The text layer corresponding to the highlighted content is compressed using JBIG2 compression and the image layer is compressed using JPEG compression, while the text layer (separate from the text layer corresponding to the highlighted content) is compressed using JBIG2 compression. The text layer corresponding to the highlighted content and the image layer and the text layer corresponding to the non-highlighted content are integrated to generate an image data in an MRC file format.

The image layer includes background information and non-textual information. The method includes storing the generated image data in a memory. Further, the highlighted content is stored as a separate text layer. The resolution value corresponding to the highlighted content is selected by a user. Alternatively, the resolution value corresponding to the highlighted content is selected automatically. The method includes extracting the MRC file to retrieve the compressed text layers and the compressed image layer; decompressing the MRC file and transmitting the decompressed MRC file to an output device.

According to additional aspects herein, an image processing system is described. The image processing system includes a processor, a content identification unit coupled to the processor, and a document generation unit coupled to the processor. The content identification unit is to detect a highlighted portion from a received document and to automatically segment the highlighted portion as a text layer and further segment the remaining portion as a separate text layer and an image layer. The document generation unit is to assign a resolution to the highlighted portion, wherein the resolution assigned to the highlighted portion is greater than a resolution for the remaining portion, to improve quality of the highlighted portion. Further, the document generation unit is to integrate the text layer corresponding to the highlighted portion and the separate text layer and the image layer to generate a scanned document in a Mixed Raster Content (MRC) file format.

The image processing system includes a memory for storing the scanned document. The resolution value corresponding to the highlighted portion is selected by a user. The resolution value corresponding to the highlighted portion is automatically selected.

Overview

Mixed or Multiple Raster Content (MRC) is one of the popular compression/file formats and is becoming increasingly important in the marketplace. MRC is a format of PDF file for storing compressed image data into at least two components, namely text layer component and an image layer component. For example, image content is stored in the form of an image layer, while text content is stored in the form of a text layer. Different compression schemes are being used for the image layer and the text layer. For example, JPEG compression is used for the image layer, while JBIG2 compression is used for the text layer. The image data in the MRC file format is then stored in a memory device. The image data stored in the MRC file format is output by an output device such as a computer, a display device, a printer or any other device. This is generally how the MRC file is created corresponding to a document containing text content and image content.

When documents contain highlighted content, the existing solutions segment the highlighted content as image content and the image content is stored as an image layer. The image layer is stored as JPEG compression. JPEG compression is a high compression technique and the highlighted content may not have appropriate image quality and sharpness owing to high compression. The MRC output file includes a text layer (corresponding to text content) and the image layer, where the same resolution is assigned to the highlighted content and non-highlighted content under the image layer. Consequently, the highlighted content in the MRC output file may be illegible, blurred, or hazy. Hence, the existing solutions do not provide the highlighted content of desirable quality in the MRC output file, despite the highlighted content is important for the user or requires user's attention. In view of the above, the highlighted content needs to be handled such that quality of the highlighted content in the output MRC file is maintained/enhanced considering the highlighted content is important for the user. The present disclosure provides methods and systems to handle the highlighted content in an effective manner and ensures the highlighted content is of high quality in the output MRC file.

The present disclosure discloses methods and systems for enhancing image quality of documents containing highlighted content/portion, particularly, enhances quality of highlighted content in an output digital document (or MRC file). The methods and systems provide appropriate detection and conversion of a highlighted content in a document, while maintaining a compression ratio and image quality of the output digital document. The highlighted content in the output digital document has requisite clarity and sharpness. For instance, underlying text/image in a highlighted content is sufficiently legible and provides better clarity.

Embodiments described herein refer to generation of digital documents corresponding to documents having highlighted content. In an example, a physical document includes one or more content types, such as, text, and/or image, wherein a portion of content represents a highlighted content. It will be appreciated that as against traditional categorization, the present subject matter introduces the concept of "highlighted content" as being automatically segmented as a text layer and is further considered as a text layer separate than the standard text and image layers.

On receiving the physical document, the highlighted content is detected. To detect the highlighted content, one or more known highlighted content detection techniques may be used that may be separate from image and text detection techniques. The provision of the highlighted content being identified and segmented as a text layer prevents it from being misclassified as an image and a separate compression/resolution is applied to the highlighted content to provide better quality. A resolution is assigned to the highlighted content such that the resolution assigned to the highlighted content is greater than the respective pre-defined resolution for the text layer and the image layer, to improve quality of the highlighted content. For example, the MRC file includes multiple layers—2 text layers and 1 image layer, where each layer is assigned with different resolutions. One text layer represents content corresponding to the highlighted content, other text layer represents normal text content and the image layer represents normal image content.

The clarity of the highlighted content in the digital document is enhanced owing to a higher resolution factor assigned to it. The higher resolution factor prevents a highlighted section from erroneously segmented as image content, thereby preventing it from undergoing lossy compression. Consequently, the clarity and sharpness of content in the highlighted content is maintained/enhanced in the digital document. Since, the highlighted content typically amounts for a small portion of the entire physical document, higher resolution or less compression may not adversely affect the compression ratio of the document, while at the same time ensuring better quality. Thus, the present subject matter provides for appropriate detection of highlighted content and efficient processing of the highlighted content to generate a better quality digital document, i.e., an MRC file format.

Exemplary Embodiments

Figure 1:
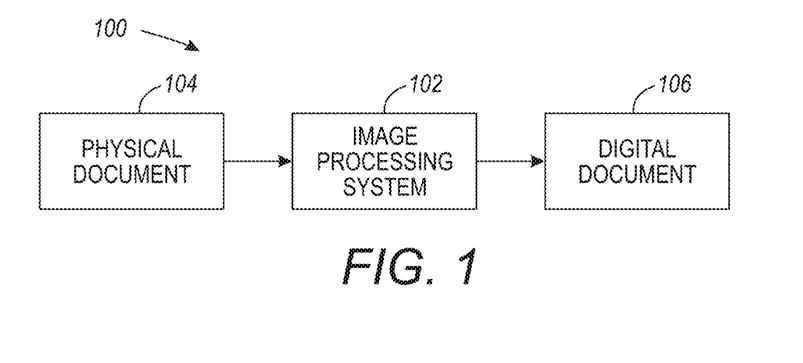
FIG. 1 illustrates an image processing environment, according to an embodiment of the present disclosure.

FIG. 1 illustrates an image processing environment 100, according to an embodiment of the present disclosure. The image processing environment 100 includes an image processing system 102 such as a multi-function device. The image processing system 102 may be a scanner or any device with scanning functionality. As shown, the image processing system 102 receives an input, for example, a physical document 104. In another example, the input may correspond to an image data obtained upon scanning.

The document 104 is an input document that the user provides for scanning and may relate to the user. Various examples of the document 104 include, but not limited to, a government proof, a book, a manual, a form, a guide, and so on. The document 104 includes content in the form of text, image, graphic or a combination thereof. The content may be in any color and the same color is maintained in an output document 106, i.e., a digital document 106.

The document 104 further includes a highlighted portion. The highlighted portion defines the portion of the content, which requires attention of the user and is important for the user. The highlighted portion may be highlighted by the user using a marker, a pen, a highlighter or the like. In an example, the document 104 may include content in one or more colors and portions of such content may be further highlighted in one or more different colors. The color of the content may be black, and the color using which the content is highlighted may be blue, for example. In said example, the color of the content and the highlighted content color may be maintained during scanning.

The highlighted portion may be text content, image content or a combination thereof. The content other than the highlighted portion, i.e., is referred to as non-highlighted portions. The non-highlighted portion includes text content and image content. For example, the text content may include sections that are highlighted, referred to as highlighted portions, and the remaining portion is referred to as non-highlighted portions. In other examples, the highlighted portion may also include image.

The image processing system 102 receives the document 104, scans the document 104, and processes the document 104 to generate the digital document 106 or image data. The digital document 106 is an output document generated upon scanning. The digital document 106 is in a PDF form. The PDF may be generated in an MRC file format or a non-MRC file format. For the purpose of present disclosure, the MRC format of the PDF is relevant and will be discussed. The image processing system 102 first checks whether the highlighted area is present or not in the scanned document. Based on the check, the highlighted area is classified as text layer and assigned to high DPI & rest of the image is processed through segmentation.

In the MRC file format, the image content and the text content are stored separately as separate layers, i.e., image content is stored as an image layer, while the text content is stored as a text layer. In context of the current disclosure, the MRC file includes an additional text layer corresponding to the highlighted portion of the document 104. The text layer is separate from the text layer corresponding to the text content, i.e., non-highlighted portion. In all, the MRC file includes multiple layers—2 separate text layers and 1 image layer, where each layer is assigned with different resolutions. One text layer represents content corresponding to the highlighted content, other text layer represents text content and the image layer represents the image content. Here, the addition of the text layer corresponding to the highlighted portion and a higher resolution value not only improves text quality but may also provide opportunities for file size reduction (i.e., data compression). Therefore, the digital document 106 includes the highlighted portion such that the highlighted portion is legible and has appropriate clarity and sharpness.

The MRC file can be used with a digital computer or machine, such as a printer. For example, the MRC file that includes computer or machine-readable instructions to be executed by a processor to render or provide an image data corresponding to the MRC file. The MRC file may be stored on otherwise provided on a computer or machine-readable storage media device (i.e., flash memory, DVD/CD ROM, floppy disk, removable or permanent hard drive, etc.).

Figure 2:
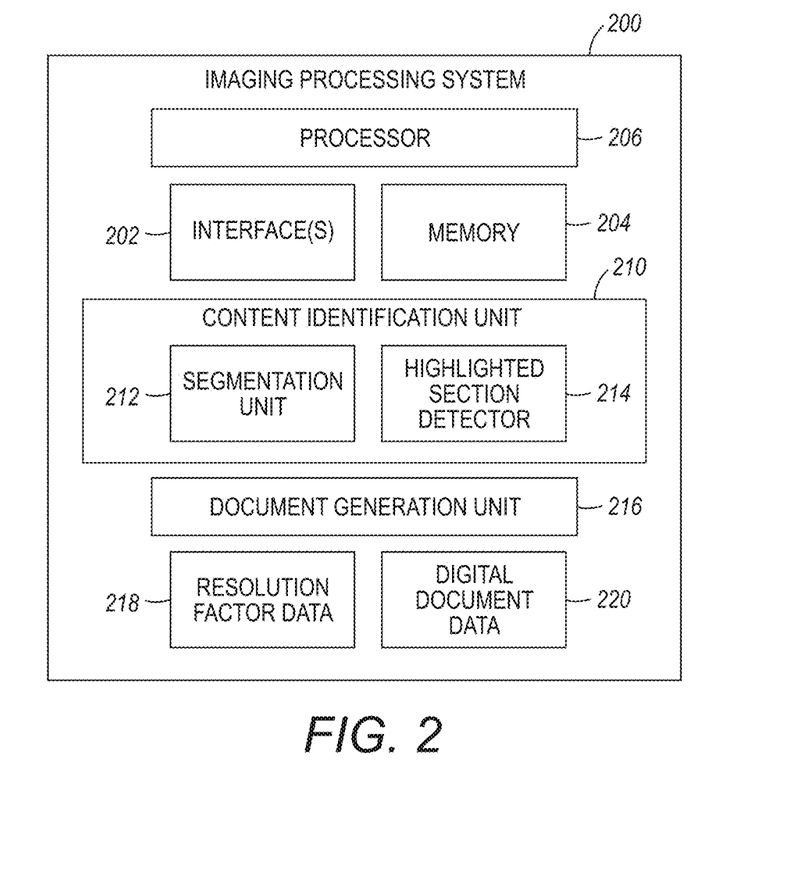
FIG. 2 illustrates an overall image processing system for enhancing image quality for documents with highlighted portions, according to an embodiment of the present disclosure.

FIG. 2 illustrates a system including components of the image processing system 200 for generating a digital document corresponding to a physical document, according to an embodiment of the present subject matter. The image processing system 200 may be a computing system with image processing capabilities, such as a standalone scanning device, a smartphone with a scanner, a camera with a scanner, and the like. The image processing system 200 includes interface(s) 202, one or more processor(s) 206, and a memory 204. The interfaces 202 may include a variety of software and hardware interfaces, for example, interfaces for peripheral device(s), such as a keyboard, a mouse, a touch pad, and an external display device. Further, the interfaces 202 may enable the image processing system 200, to communicate with other devices, such as web servers, and other computing devices. The interfaces 202 can facilitate multiple communications within a wide variety of networks, and protocol types, including wired networks, for example, local area network (LAN), cable, etc., and wireless networks such as Wireless LAN (WLAN), cellular, or satellite.

The processor 206 may be implemented as one or more microprocessors, microcomputers, microcontrollers, digital signal processors, central processing units, state machines, logic circuitries, and/or any devices that manipulate signals based on operational instructions. Among other capabilities, the processor 206 may be configured to fetch and execute computer-readable instructions stored in the memory 204.

The functions of the various elements shown in the figure, including any functional blocks labeled as processor(s), may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

The memory 204 may be communicatively coupled to the processor 206. The memory 204 may include any non-transitory computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 204 stores the digital document in an MRC file format. The memory 204 further stores the compressed text layer corresponding to the highlighted content.

The image processing system 200 includes a content identification unit 210 and a document generation unit 216 coupled to the processor 206. In an example, the content identification unit 210 and the document generation unit 216 may be part of a scan module (not shown in the figures) of a scanner. The content identification unit 210 and the document generation unit 216, amongst other things, include routines, programs, objects, components, data structures, etc., which perform particular tasks or implement particular abstract data types. The units 210 and 216 may also be implemented as, signal processor(s), state machine(s), logic circuitries, and/or any other device or component that manipulate signals based on operational instructions. In another example, the units 210 and 216 can be implemented in hardware, instructions executed by the processor 206, or by a combination thereof.

In operation, a user provides the physical document for generating a corresponding digital document, such as a scanned document in an MRC format. The physical document includes various content types, viz., text content, image content, and one or more highlighted sections. In an example, the highlighted section may include text. Further, for the sake of explanation and not as a limitation, a continuous portion of the physical document, which is highlighted may be understood as a highlighted section. It will be appreciated that in other implementations, other rules may be used. For instance, each line may correspond to a section or a predetermined number of lines or predefined area may constitute a section, and when such section may be highlighted, it may be referred to as the highlighted section.

The physical document is received by the content identification unit 210. For example, the physical document may be placed on a scanning area of the image processing system 200. On receiving the physical document 110, the content identification unit 210 detects various content types.

The content identification unit 210 detects one or more highlighted sections are detected from a scanned image corresponding to the physical document using a highlighted section detection technique. The scanned image may be a temporary image generated upon segmentation performed by the segmentation unit 212. Conventionally, a highlighted section may be erroneously classified image, for instance, owing to variation in color. Therefore, to accurately detect the highlighted section, separate detection techniques may be used. For instance, a highlighted section detector 214 of the content identification unit 210 may implement a highlighted section detection technique to determine the highlighted sections. In an example, a morphological operation-based technique and a threshold reduction technique may be used to detect highlighted sections. In another example, a multi-mask compression technique, such as a two-layer multi-mask compression technique may be used to detect highlighted sections. Thus, any technique capable of separating highlighted portion of the physical document from a non-highlighted portion may be used. Upon detecting highlighted sections, optical character recognition (OCR) may be used to extract content, such as text from the highlighted sections.

The segmentation unit 212 of the content identification unit 210 automatically segments the content types. The segmentation includes identification and extraction of text content and image content. The segmentation unit 212 may implement an image segmentation method, for instance, the image segmentation methods implemented by an MRC compression technique. In an example, identification and extraction of content types may occur in parallel. Further, like the text content and the image content, the highlighted section, is segmented into separate layers. Thus, in case the physical document 104 include three content types (image, text, and highlighted section), 3 separate layers are generated, where the highlighted section is segmented as a text layer, the text content is segmented as a separate a text layer, and the image content is segmented as an image layer.

Although the content identification unit 210 and the document generation unit 216 have been illustrated as separate units, certain functionalities of both the units 210 and 216 may overlap. For instance, the segmentation unit 212 may overlap with certain functionalities of the document generation unit 216.

Upon segmentation, the document generation unit 216 assigns a resolution factor with each of the layers, i.e., content types. According to an aspect of the present subject matter, the document generation unit 216 assigns a highest resolution factor to the highlighted section as compared to other two content types. Thus, the highlighted section has a resolution factor greater than that of the text content and the image content. Further, the document generation unit 216 assigns a resolution factor to the text content and the image content. In an example, a resolution factor assigned to the image content may be lower than the resolution factor assigned to the text content. The higher resolution factor assigned to the highlighted section prevents it from undergoing lossy compression at a later stage to maintain its legibility.

The values of the resolution factors are stored in resolution factor data 218. In an example, the document generation unit 216 select values for the resolution factors, based on a user input and in the absence of the input/based on system settings, may select default values. For instance, the user may indicate a maximum resolution, a minimum resolution, or provide a range. In other examples, the user may indicate a level wise resolution. For the sake brevity, the generation of digital documents is explained in detail with respect to a user selecting an overall resolution of the digital document, it will be appreciated that the similar principles may be applied for user providing inputs for layer wise resolution.

In an example, the resolution factor assigned to the image content may be 100 DPI, the resolution factor assigned to the text content may be 200 DPI, and the resolution factor assigned to the highlighted section may be 600 DPI. In another example, the resolution factor assigned to the highlighted section may be the maximum available resolution. In other examples, the resolution factor for the highlighted section may have any value greater than the resolution factor of the text content and/or the image content.

Upon associating the relevant resolution factors with each content type, the document generation unit 216 compresses each layer and bound them together to generate the digital document. In an example, the text layer may undergo lossless JBIG2 compression and the image layer may undergo lossy JPEG compression. Further, the highlighted section may also undergo same compression as that of the text layer but in accordance with the resolution factor assigned to it. Thus, each content type is compressed based on a resolution factor, which in turn provides for better quality of the digital document so generated.

Upon compression, a final outcome is the digital document corresponding to the physical document. The digital document thus generated clearly illustrates the highlighted sections with required sharpness and clarity. The digital document may be stored in the digital document data 220. In an example, the digital document may be provided over a network to a user or may be stored in a database for further use.

Figure 3:
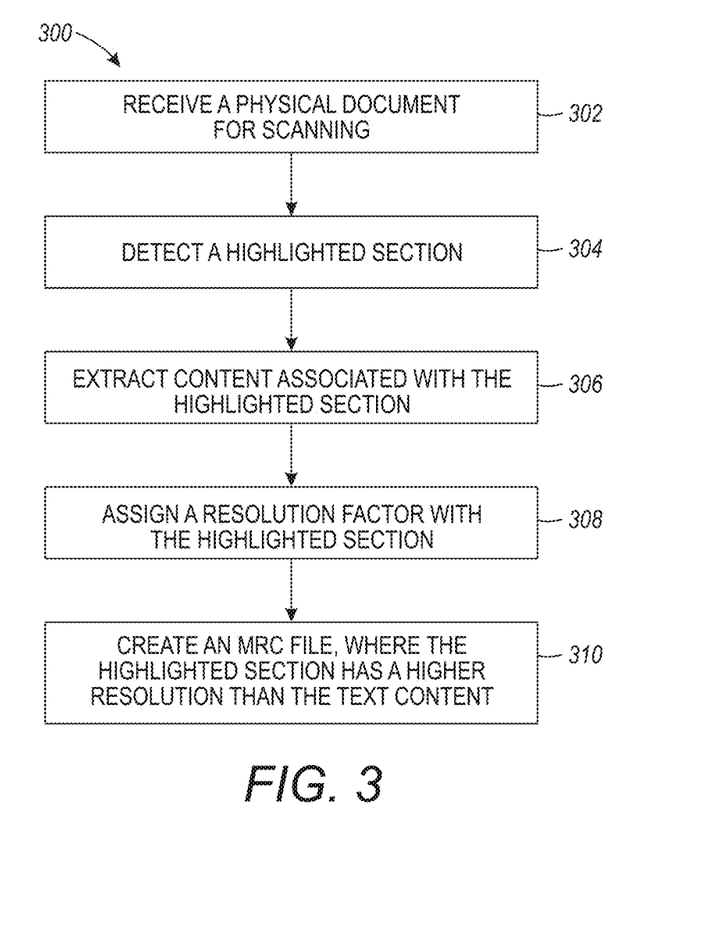
FIG. 3 is a computer-implemented method for processing highlighted portions of a document, according to an embodiment of the present disclosure.
Figure 4:
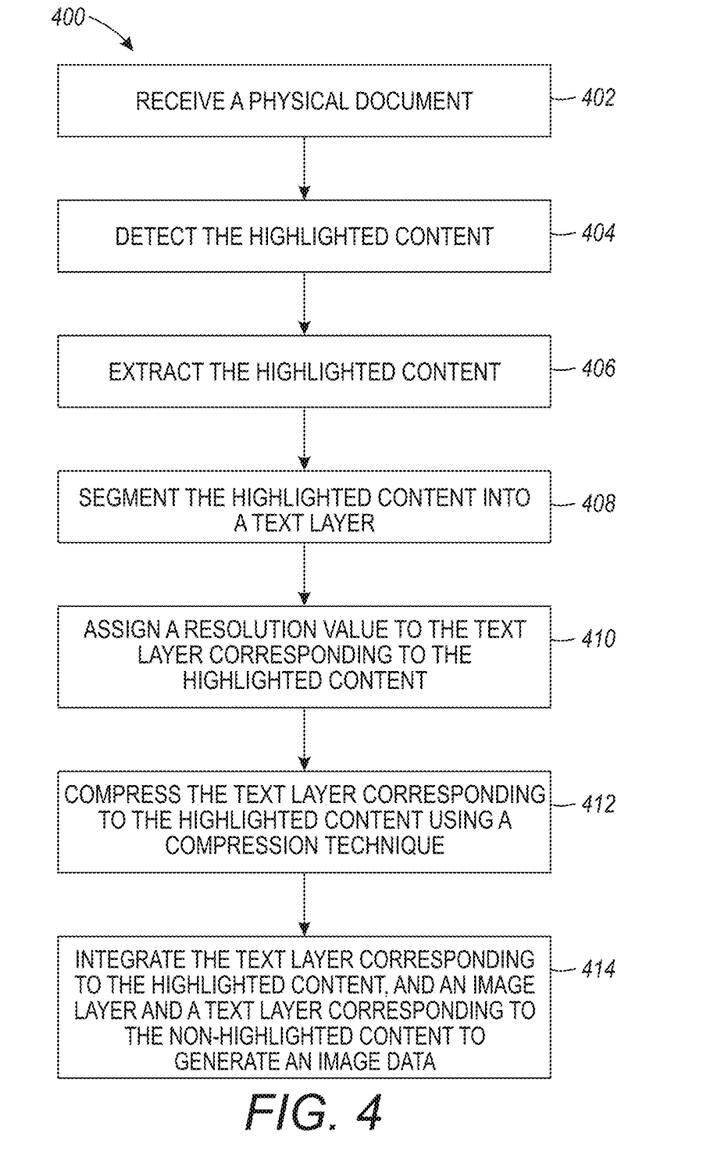
FIG. 4 illustrates a computer-implemented method for generating a digital document corresponding to the physical document, according to an embodiment of the present subject matter.

FIG. 3 illustrates a method 300 for processing a highlighted section of a physical document, and FIG. 4 illustrates a method 400 for generating a digital document corresponding to a physical document, according to an embodiment of the present subject matter. The digital document may be in a hybrid file format, such as pdf, which supports different layers. For the sake of brevity, construction and operational features of the system which are explained in detail in the description of FIG. 1 and FIG. 2 are not explained in detail here in the description of FIG. 3 and FIG. 4.

The order in which the methods 300 and 400 are described is not intended to be construed as a limitation, and any number of the described method blocks can be combined in any appropriate order to execute the methods 300 and 400 or an alternative method. Additionally, individual blocks may be deleted from the methods 300 and 400 without departing from the spirit and scope of the subject matter described herein.

The methods 300 and 400 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media. The methods are executed by a non-transitory computer-readable medium comprising instructions executable by a processor.

The method begins when a user has a document with highlighted section and wishes to scan the document to generate a digital document. The section is highlighted by the user using one or more ways as discussed above and the section which requires user's attention or needs to be noticed is highlighted by the user. For simplicity, one section is highlighted by the user, however, the user can highlight more than one section in the physical document and the highlighted sections can be processed accordingly.

Referring to FIG. 3, at block 302, a physical document is received for scanning. At the time of scanning, the user selects an option MRC to scan the document. The selection of MRC option by the user indicates that the user wishes to have the scanned document where image is stored as a separate layer and text as a separate layer. The physical document includes text content, image content, and a highlighted section. The highlighted section may include a text content and/or an image content.

Upon receiving the document, at block 304, the highlighted section is detected/identified. The highlighted section may be detected using at least one of a multi-mask compression technique, a morphological operation-based technique, a threshold reduction technique or a combination of these. Then, text content and image content from the remaining portion of the physical document is identified.

At block 306, content, i.e., data associated with the highlighted section is extracted. For instance, text corresponding to the highlighted section may be extracted using, for instance, Optical Character Recognition (OCR) techniques. In case the highlighted section is image, the image is extracted using image recognition algorithms as known or later developed. After extracting the content, a text layer is generated corresponding to the highlighted section. Similarly, the remaining portion of the physical document, i.e., text content and image content are extracted. And thereafter, a text layer and an image layer are generated corresponding to the remaining portion of the physical document.

At block 308, a resolution factor is assigned to the highlighted section, the resolution factor assigned to the highlighted section is higher than the resolution factor of the remaining portion of the physical document, i.e., the text content and the image content. In an example, the resolution factor may be in the form of DPIs. Thus, a higher resolution factor may indicate a higher DPI.

At block 310, an MRC file is created including the text layer corresponding to the highlighted section with a higher resolution than the text layer corresponding to the normal text content.

The method 300 focuses on placing the highlighted text in a separate text layer of the MRC file other than the standard image layer and the text layer and further assigns the higher resolution to the text layer corresponding to the highlighted section than the standard text layer and the image layer. This allows the highlighted text to be saved at a higher quality than normal text.

FIG. 4 is detailed method flowchart 400 for processing documents with highlighted portions, according to an embodiment of the disclosure. In an example, steps of the method may be performed after image data generation and before scan file generation. The method can be implemented by any image processing device with scanning functionality such as a multi-function device, a scanner or any equivalent device. The method is explained with a perspective where the outlined blocks are implemented by the image processing device. The highlighted portion has to be noticeable and thus, there is need to produce the highlighted portion of the required quality.

The method beings with when a user wishes to scan a document using an MRC option. At 402, a physical document and/or image data is received for scanning. The document includes text content, and/or image content. A portion of the text content or the image content is highlighted and is referred to as a highlighted content. In some examples, the highlighted content may include a text content. In other examples, the highlighted content may include an image content. In further example, the highlighted content may be a combination of the text content and the image content.

At 404, the document is analyzed to automatically detect the highlighted content. Various techniques such as a multi-mask compression technique, a morphological operation-based technique and a threshold reduction technique may be used to detect the highlighted content. After detecting the highlighted content, the remaining content is marked as a non-highlighted content. At 406, the highlighted content is extracted. Similarly, the non-highlighted content is identified and extracted. The highlighted content may include text and/or image. Similarly, the non-highlighted content includes text and image.

Then, the highlighted content is automatically segmented into a text layer, at 408 and the non-highlighted content is segmented into an image layer and a text layer, where image content is segmented under the image layer and text content is segmented under the text layer. The image layer and the text layer correspond to the standard image and text layers.

The standard text layer is separate from the text layer corresponding to the highlighted content.

Here, morphological based segmentation may be used for segmenting the image and text layers. The segmentation step is performed for compression purposes. In an implementation, the segmented data may be tagged to identify the types of data represented before a compression scheme is determined and/or selected. For example, based on the tag information associated with the image data, the segmentation unit 212 generally segments the image data into an image layer and a text layer.

At 410, a resolution value is assigned to the text layer corresponding to the highlighted content and a pre-defined resolution value is assigned to the image layer and a separate text layer, i.e., non-highlighted content. The resolution value is assigned such that the resolution value corresponding to the highlighted content is always greater than the respective resolution value corresponding to the image layer and the text layer, i.e., corresponding to the non-highlighted content. Specifically, the resolution value assigned to the highlighted content may be greater than the resolution value assigned to the text layer, i.e., non-highlighted content. In an example, a resolution factor associated with the image content may be same or lower as that of the text content.

The pre-defined resolution may be set by the image processing system 200. The pre-defined resolution may be provided by the user. The resolution value corresponding to the highlighted portion is selected by a user. The resolution value may be selected by the user based on requirements of the user. The resolution value corresponding to the highlighted portion is automatically selected by the image processing system 200.

At 412, the text layer corresponding to the highlighted content is compressed using a compression technique JBIG2. The image layer is compressed using standard contone compression schemes such as JPEG, while the text layer is compressed using any of the binary compression schemes such as JBIG2.

Finally, at 414, the text layer corresponding to the highlighted content, and the image layer and the text layer corresponding to the non-highlighted portion are integrated to generate an image data in an MRC file format. In this manner, a digital document of MRC format is created such that the highlighted section is presented with required clarity and sharpness. The MRC file is stored in a memory of the image processing system 200. The method includes storing the text layer corresponding to the highlighted content.

In some implementations, the method may include creating multiple colored text layers. For example, a first text layer may be black text, and a second text layer may be some other color text (e.g., red). The number of layers depend on the number of colors of the text content in the document.

In some implementations, there may be an additional non-image data layer included in the MRC image data file. The non-image data layer contains rendering hints which can be used by a rendering engine, such as Adobe® Acrobat®, to provide additional information on how particular pixels are rendered on an output device such as a printer. In such implementations, the non-image data later is integrated with the three layers as discussed above. In this manner, the image data is generated in the MRC file format.

The MRC file is output by an output device. To output the MRC file, the method includes retrieving the MRC file from the memory. After retrieving, the MRC file is decompressed before sending the image data to a rendering engine of the output device. Finally, the decompressed file is transmitted to the output device. The output device may be any type of device that is designed to output the image data. Examples of the output may include, but not limited to, display, copy, print, or send the image data. And examples of the output device may further include a multifunctional device (MFD) or a printer, a computer, a copier, a scanner, a facsimile device, a display device and so on.

Figure 5:
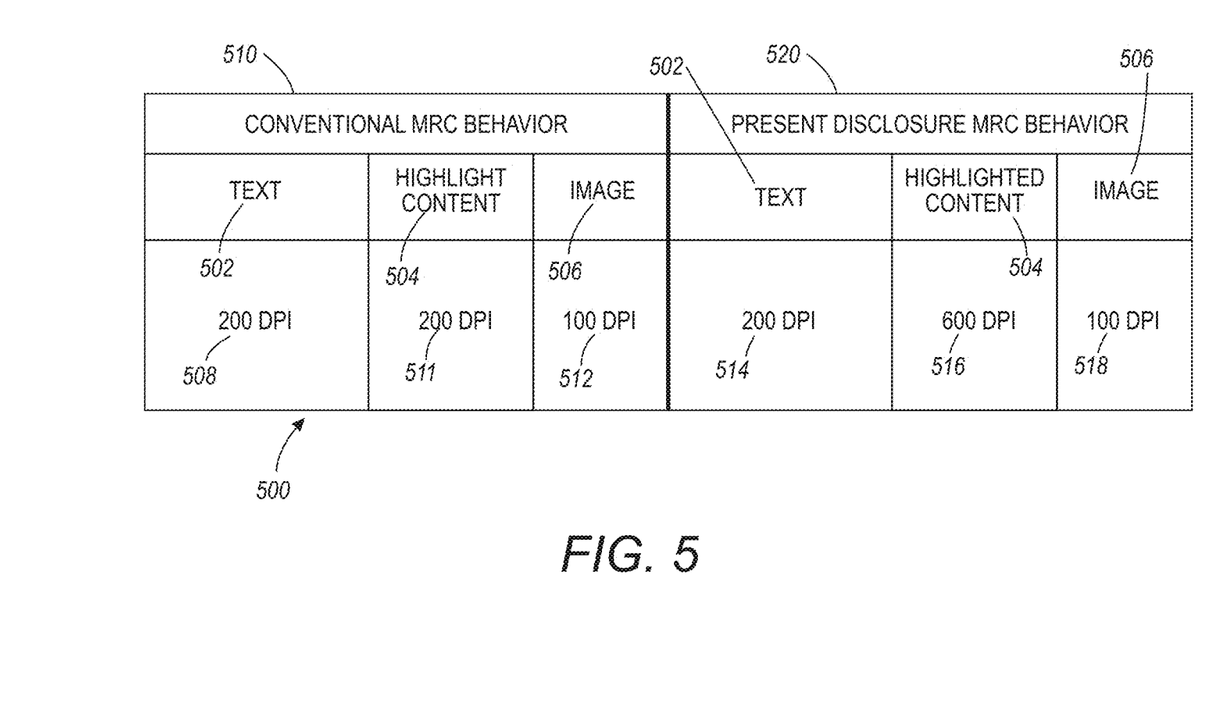
FIG. 5 represents a screenshot depicting DPI values as per conventional solutions and as per the present disclosure.

In a table 500 of FIG. 5, a conventional MRC behavior 510 and present disclosure MRC behavior 520 is shown. It is considered that a document includes a text content (502), an image content (506) and a highlighted content (504). The text (502) is segmented as a text layer and the image (506) is segmented as an image layer in both the cases 510 and 520. In the conventional MRC behavior 510, the highlighted content (504) is segmented as an image layer, while the highlighted content (504) is segmented as a text layer according to the present disclosure MRC behavior 520. Further, according to conventional solutions, the text (502) and the highlighted content (504) is assigned with same DPI such as 200 DPI (indicated as 508 and 511) and 100 DPI (indicated as 512) is assigned to the image content. It must be noted that the same DPI is assigned to the highlighted content (504) and to the non-highlighted content, i.e., to the image content (506). According to the present disclosure, the text content (502) is assigned with 200 DPI (indicated as 514), the highlighted content (504) is assigned with 600 DPI (indicated as 516) and the image content (506) is assigned with 100 DPI (indicated as 518). It must be noted here that a different DPI is assigned to the highlighted content and moreover, the DPI assigned to the highlighted content is greater than the normal text content and the normal image content (502, 506, respectively). The greater DPI assigned to the highlighted content helps provide more clarity and sharpness and thereby enhances image quality of the highlighted content.

Figure 6:
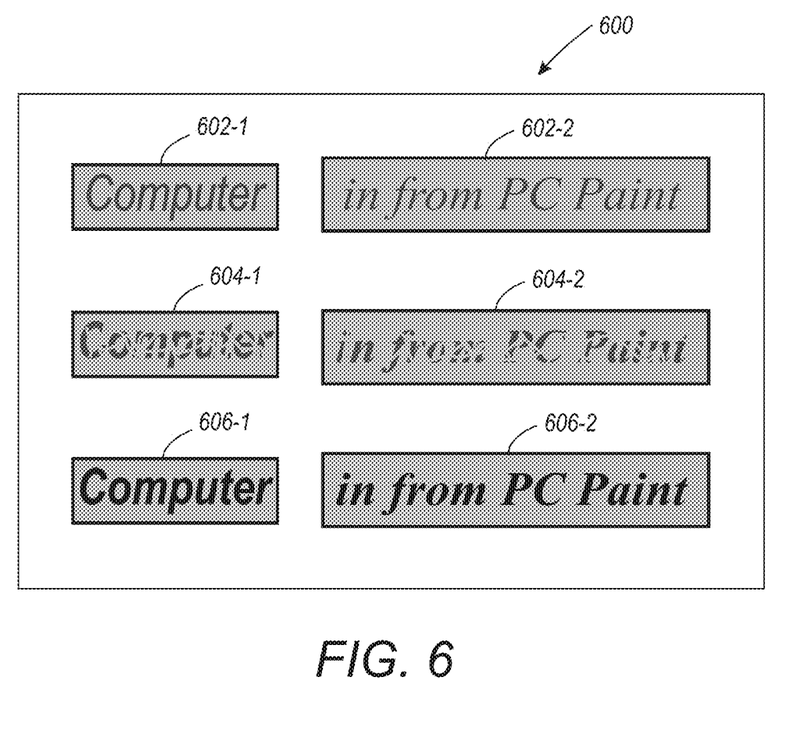
FIG. 6 illustrates screenshots indicating an input and an output according to conventional solutions and as per the present disclosure.

FIG. 6 illustrates a screenshot 600 indicating image processing performed by embodiments of present subject matter. Images 602-1 and 602-2 correspond to snippets of highlighted sections in a physical document. Images 604-1 and 604-2 correspond to snippets of highlighted sections in a digital document generated using conventional techniques. Further, images 606-1 and 606-2 correspond to snippets of highlighted sections in a digital document generated using embodiments of the present disclosure. As can be seen, the highlighted sections in the images 604-1 and 604-2 are blurred and lack clarity, while the highlighted sections in the images 606-1 and 606-2 have better quality with desired sharpness and substantial clarity. Thus, owing to appropriate detection and assignment of higher resolution factor to the highlighted content as compared other content types, the clarity and legibility of the highlighted sections is maintained, thereby enhancing overall quality of the digital document.

With the assignment of a higher resolution value to the highlighted content and segmenting the highlighted content as text layer and further compressing the text layer with binary compression scheme, not only improves text quality, but may also provide opportunities for file size reduction (i.e., efficient data compression).

The present disclosure discloses methods and systems for improving image quality for documents with highlighted content. The methods and systems consider the highlighted content as a separate text layer of an MRC file than the standard image layer and the text layer and further assign the higher resolution to the text layer corresponding to the highlighted content than the standard text layer. This allows the highlighted content to be saved at a higher quality than the standard text layer. Since all text content is not required to be promoted to a higher resolution the overall compression remains relatively similar, yet the highlighted text is improved. In all, the methods and systems provide better text quality of highlighted text with minimal effect on the compression ratio and this enables the text with important information have high quality. In this manner, the methods and systems provide better experience and usability for users. Additionally, the segmentation errors can be avoided using the present disclosure.

For a person skilled in the art, it is understood that the use of phrase(s) "is," "are," "may," "can," "could," "will," "should," or the like, is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "scanning," or "segmenting," or "storing," or "generating," or "receiving," or "transmitting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for enhancing image quality for documents with highlighted portions, the method comprising:
    detecting a highlighted portion from a received input;
    automatically segmenting the highlighted portion as a text layer and further segmenting a remaining portion of the received input, wherein the remaining portion is segmented as a separate text layer and an image layer;
    assigning a resolution to the highlighted portion, wherein the resolution assigned to the text layer of the highlighted portion is greater than the respective pre-defined resolutions for the separate text layer and the image layer, to improve quality of the highlighted portion; and
    integrating the text layer corresponding to the highlighted portion, and the separate text layer and the image layer to generate a scanned document in a Mixed Raster Content (MRC) file format.

2. The method of claim 1, wherein the received input is one of a physical document and an image data obtained upon scanning.

3. The method of claim 1, further comprising identifying text content and image content from the remaining portion of the received input.

4. The method of claim 3, further comprising segmenting the text content as the separate text layer and the image content as the image layer.

5. The method of claim 1, further comprising extracting content corresponding to the highlighted portion of the received input.

6. The method of claim 1, further comprising extracting content corresponding to the remaining portion of the received input.

7. The method of claim 1, further comprising compressing the text layer corresponding to the highlighted portion and the separate text layer using JBIG2 compression and compressing the image layer using JPEG compression.

8. The method of claim 1, further comprising storing the generated scanned document.

9. The method of claim 1 is implemented by a non-transitory computer-readable medium comprising instructions executable by a processor.

10. A method comprising:
    receiving an input;
    automatically detecting a highlighted content from the received input and marking a remaining content of the received input as a non-highlighted content;
    automatically segmenting the highlighted content into a text layer and further segmenting the non-highlighted content into an image layer and a text layer;
    assigning a first resolution value to the text layer corresponding to the highlighted content and a second resolution value each to the image layer and the text layer corresponding to the non-highlighted content, wherein the first resolution value assigned to the highlighted content is greater than the respective second resolution value for the image layer and the text layer, to improve quality of the highlighted content;
    compressing the text layer corresponding to the highlighted content using JBIG2 compression and further compressing the image layer corresponding to the non-highlighted content using JPEG compression and the text layer corresponding to the non-highlighted content using JBIG2 compression; and
    integrating the text layer corresponding to the highlighted content, and the image layer and the text layer corresponding to the non-highlighted content to generate an image data in an MRC file format.

11. The method of claim 10, wherein the image layer comprises the background information and non-textual information.

12. The method of claim 10, further comprising storing the generated image data in a memory.

13. The method of claim 10, further comprising storing the highlighted content as a separate text layer.

14. The method of claim 10, wherein the first resolution value corresponding to the highlighted content is selected by a user.

15. The method of claim 10, wherein the first resolution value corresponding to the highlighted content is automatically selected.

16. The method of claim 10, further comprising:
    extracting the MRC file to retrieve the compressed text layers and the compressed image layer;
    decompressing the MRC file; and
    transmitting the decompressed MRC file to an output device.

17. An image processing system comprising:
    a processor;
    a content identification unit coupled to the processor, the content identification unit being a logic circuit, wherein the content identification unit is configured to:
        detect a highlighted portion from a received document; and
        automatically segment the highlighted portion as a text layer and further segment the remaining portion of the received document, wherein the remaining Portion is segmented as a separate text layer and an image layer; and
    a document generation unit coupled to the processor, the document generation unit being a logo circuit, wherein the document generation unit is configured to:
        assign a resolution to the text layer of the highlighted portion, wherein the resolution assigned to the highlighted portion is greater than another resolution for the remaining portion, to improve quality of the highlighted portion; and
        integrate the text layer corresponding to the highlighted portion and the separate text layer and the image layer to generate a scanned document in a Mixed Raster Content (MRC) file format.

18. The image processing system of claim 17, further comprising a memory for storing the scanned document.

19. The image processing system of claim 17, wherein the resolution value corresponding to the highlighted portion is selected by a user.

20. The image processing system of claim 17, wherein the resolution value corresponding to the highlighted portion is automatically selected.

\* \* \* \* \*